United States Patent [19]

Hert

[11] Patent Number: 5,483,001
[45] Date of Patent: Jan. 9, 1996

[54] THERMOPLASTIC COMPOSITIONS BASED ON ETHYLENE POLYMER AND POLYESTER

[75] Inventor: Marius Hert, Verneuil-en-Hallate, France

[73] Assignee: Norsolor, Paris, France

[21] Appl. No.: 328,543

[22] Filed: Oct. 25, 1994

Related U.S. Application Data

[63] Continuation of Ser. No. 45,301, Apr. 12, 1993, abandoned, which is a continuation of Ser. No. 543,793, Oct. 1, 1990, abandoned.

[30] Foreign Application Priority Data

Mar. 30, 1988 [FR] France .................... 88 04193

[51] Int. Cl.$^6$ ................ C08L 67/02; C08L 35/00; C08L 37/00
[52] U.S. Cl. ............... 525/166; 525/176; 524/512
[58] Field of Search ...................... 525/176, 166

[56] References Cited

U.S. PATENT DOCUMENTS

| | | |
|---|---|---|
| 3,888,943 | 6/1975 | Labana et al. . |
| 4,612,349 | 9/1986 | Nicco et al. . |
| 4,657,781 | 4/1987 | Nicco et al. . |
| 4,914,152 | 4/1990 | Miyashita ......................... 525/166 |
| 5,068,283 | 11/1991 | Ohmae ............................ 525/166 |

FOREIGN PATENT DOCUMENTS

| | | |
|---|---|---|
| 0268287 | 5/1988 | European Pat. Off. . |
| 2602514 | 2/1988 | France . |
| WO85/03718 | 8/1985 | WIPO . |

OTHER PUBLICATIONS

Lee, H. Handbook of Epoxy Resins, pp. 5/20–21 McGraw–Hill Book Co. N.Y. (1967).

Die Angewandte Makromolekulare Chemie, Hert et al., vol. 154, No. 2516, pp. 111–120 (Sep. 1987).

Primary Examiner—Patricia A. Short
Attorney, Agent, or Firm—Finnegan, Henderson, Farabow, Garrett & Dunner

[57] ABSTRACT

Thermoplastic composition comprising at least 40% by weight and not more than 70% by weight of a crosslinked polymer phase obtained by blending at least one copolymer (a) of 96 to 55% by weight of ethylene, of 3 to 30% by weight of at least one alkyl or cycloalkyl acrylate or methacrylate in which the alkyl or cycloalkyl group contains from 1 to 10 carbon atoms, and of 1 to 15% by weight of at least one unsaturated epoxide, at least one copolymer (b) comprising from 84 to 55% of ethylene by weight, from 15 to 39% by weight of at least one alkyle or cycloalkyl acrylate or methacrylate in which the alkyl or cycloalkyl group contains from 1 to 10 carbon atoms, and from 1 to 6% by weight of at least one arthydride of an unsaturated dicarboxylic acid, and at least one compound (c) capable of accelerating the reaction between the epoxy functional group present in the copolymer (a) and the arthydride functional group present in the copolymer (b); with at least 30% by weight but not more than 60% by weight of at least one saturated polyester.

15 Claims, No Drawings

THERMOPLASTIC COMPOSITIONS BASED ON ETHYLENE POLYMER AND POLYESTER

This application is a continuation of application Ser. No. 08/045,301, filed Apr. 12, 1993 which is a continuation of Ser. No. 543,793, filed Oct. 1, 1990, now both abandoned.

The present invention relates to alloys of soft ethylene copolymers and of saturated polyesters, which may be employed particularly for the production of moulded articles having good dimensional stability when heated.

It is very difficult to combine the following properties in an alloy based on a saturated polyester: low flexural elasticity modulus (softness), good cold impact strength and, furthermore, good tensile properties and good dimensional stability at temperatures above 100° C. Blending a soft polymer with a saturated polyester, intended to improve the heat behaviour and the tensile properties of the latter, is often found to result in demixing during injection moulding, producing brittle surface layers, liable to delamination. These disadvantages are the technical problems which the present invention is intended to overcome.

European Patent Application No. 268,287 (Kanegafuchi) describes a composition comprising:

(a) 100 parts by weight of a thermoplastic polyester, (b) from 1 to 100 parts by weight of a polymer containing an epoxy functional group, with a flexural elasticity modulus not exceeding $10^4$ kg/cm$^2$ at ambient temperature, and (c) from 0.5 to 100 parts by weight of a copolymer of α-olefin and of an α,β-unsaturated carboxylic acid, in which at least 5% of the carboxylic groups are neutralized with an alkali metal.

The polymer (b) may be a copolymer, graft or otherwise, of ethylene, of glycidyl (meth)acrylate and, optionally, of up to 10 mol% of vinyl acetate or of methyl (meth)acrylate. The copolymer (c) may be a sodium ionomer of a copolymer of ethylene, (meth)acrylic acid and $C_1$–$C_{10}$ alkyl (meth)acrylate.

The process for obtaining this composition prevents the composition from gelling when it is being converted.

The subject matter of the present invention consists of thermoplastic compositions comprising at least 40% by weight and not more than 70% by weight of a crosslinked polymer phase obtained by blending:

a) at least one copolymer of 96 to approximately 55% by weight of ethylene, of 3 to approximately 30% by weight of at least one alkyl or cycloalkyl acrylate or methacrylate in which the alkyl or cycloalkyl group contains from 1 to 10 carbon atoms, and of 1 to approximately 15% by weight of at least one unsaturated epoxide, b) at least one copolymer comprising from 84 to approximately 55% of ethylene by weight, from 15 to approximately 39% by weight of at least one alkyl or cycloalkyl acrylate or methacrylate in which the alkyl or cycloalkyl group contains from 1 to 10 carbon atoms, and from 1 to approximately 6% by weight of at least one anhydride of an unsaturated dicarboxylic acid, and c) at least one compound capable of accelerating the reaction between the epoxy functional group present in the copolymer (a) and the anhydride functional group present in the copolymer (b), with at least 30% by weight but not more than 60% by weight of at least one saturated polyester.

Within the scope of the present invention, the compound (c) must be in a sufficient quantity, in relation to the copolymers (a) and (b) to play efficiently its part as a promoter of at least partial crosslinking of the polymeric composition. A person skilled in the art will be able to determine the effective quantity of compound (c), once the proportions of epoxide in the copolymer (a) and of anhydride in the copolymer (b) have been fixed.

Finally, the simultaneous presence of components (a) and (b) is indispensable for the present invention to be effective, since the presence of component (a) by itself has a disadvantageous effect of giving the composition a melt index which is too low, that is to say a viscosity which is unsuitable for conversion by an injection-moulding technique.

Examples of alkyl acrylate or methacrylate which may be employed as constituents of copolymers (a) and (b) are, in particular, methyl methacrylate, ethyl acrylate, n-butyl acrylate, isobutyl acrylate, 2-ethylhexyl acrylate, methyl acrylate, tert-butyl acrylate and n-butyl methacrylate. Examples of unsaturated epoxides which may be employed as constituents of polymer (a) are, in particular:

aliphatic glycidyl esters and ethers such as allyl glycidyl ether, vinyl glycidyl ether, glycidyl maleate and itaconate, glycidyl acrylate and methacrylate, and alicyclic glycidyl esters and ethers such as 2-cyclohexene-1-glycidyl ether, cyclohexene-4,5-diglycidyl carboxylate, cyclohexene-4-glycidyl carboxylate, 5-norbornene-2-methyl-2-glycidyl carboxylate and endocis-bicyclo[2.2.1]-5-heptene-2,3-diglycidyl dicarboxylate.

Examples of anhydrides of an unsaturated dicarboxylic acid which may be employed as constituents of polymer (b) are, in particular, maleic anhydride, itaconic anhydride, citraconic anhydride and tetrahydrophthalic anhydride.

Among the compounds (c) capable of accelerating the reaction between the epoxy functional group present in the copolymer (a) and the anhydride functional group present in the copolymer (b) there may be mentioned, in particulars:

tertiary amines such as dimethyllaurylamine, dimethylstearylamine, N-butylmorpholine, N,N-dimethylcyclohexylamine, benzyldimethylamine, pyridine, 4-dimethylaminopyridine, 1-methylimidazole, tetramethylethylenediamine, tetramethylguanidine, triethylenediamine, tetramethylhydrazine, N,N-dimethylpiperazine and N,N,N',N'-tetramethyl-1,6-hexanediamine;

tertiary phosphines such as triphenylphosphine; and zinc or tellurium alkyldithiocarbamates.

The copolymer (a) forming part of the composition of the reinforcing polymer according to the invention may have a melt index (determined at 190° C. under 2.16 kg according to ASTM standard D 1238) chosen in a range from 1 to 50 dg/min, preferably 5 to 20 dg/min. The copolymer (b) forming part of the composition of the reinforcing polymer according to the invention may have a melt index (determined as above) chosen in a range from 1 to 50 dg/min.

The respective proportions of copolymers (a) and (b) in the crosslinked polymer phase may be such that the weight ratio (a)/(b) is between 0.1 and approximately 10, preferably between 0.5 and 2. In particular, these proportions may be chosen by a person skilled in the art as a function of the corresponding concentrations of anhydride in copolymer (b) and of unsaturated epoxide in copolymer (a); these proportions are preferably chosen so that the ratio of the anhydride functional groups present in copolymer (b) to the epoxide functional groups present in copolymer (a) is approximately equimolecular.

The saturated polyester forming part of the thermoplastic composition according to the invention may be chosen from linear saturated condensation products of glycols and dicarboxylic acids, or of their reactive derivatives. It preferably comprises the product of condensation of at least one dicarboxylic acid chosen from aliphatic dicarboxylic acids containing from 4 to 8 carbon atoms, allcyclic dicarboxylic acids containing from 8 to 12 carbon atoms and aromatic dicarboxylic acids containing from 8 to 14 carbon atoms, such as, for example, phthalic acid, isophthalic acid, 2,6-naphthalenedicarboxylic acid, 4,4'-diphenyldicarboxylic acid, adipic acid, sebacic acid or cyclohexanedicarboxylic acid, with at least one diol chosen from glycols containing from 2 to 10 carbon atoms and allcyclic or aromatic diols containing from 6 to 15 carbon atoms, such as, for example, ethylene glycol, 1,3-propanediol, 1,4-butanediol, 1,5-pentanediol, 1,6-hexanediol, 1,4-cyclohexanedimethanol, 2,2-dimethyl-1,3-propanediol, 2,2-bis(4'-hydroxyphenyl) propane, 2,2-bis(4' -hydroxycyclohexyl)propane and hydroquinone.

The preferred polyesters are poly-1,4-butylene terephthalate and polyethylene terephthalate. Their intrinsic viscosity is preferably chosen in a range from 0.3 to approximately 1.2 dl/g (measured at 25° C. at a concentration of 0.5% by weight in a mixture of equal weights of phenol and tetrachloroethane).

The compositions according to the invention may be modified with one or more conventional additives such as:

stabilizers, which may be incorporated in the composition at any stage of its preparation. The stabilizers are preferably included sufficiently early to prevent an onset of degradation before the composition can be protected, and must be compatible with the main ingredients of the composition. Viscosity stabilizers such as polycarbodiimides may be employed. Antioxidants and heat stabilizers which may be used in the materials of the present invention include those employed in addition polymers, such as, for example, sterically hindered phenols, hydroquinones, secondary amines and combinations thereof. Stabilizers against ultraviolet radiation, for example in a proportion ranging up to approximately 2% by weight, relative to the weight of the saturated polyester, may also be those employed in addition polymers such as, for example, substituted resorcinols, salicylates, benzotriazoles, benzophenones, and the like;

lubricants and mould release agents, employed, for example, in proportions ranging up to 1% relative to the weight of the composition, such as stearic acid, stearyl alcohol, stearamides, and the like;

dyes and/or pigments such as, in particular, in a proportion of up to 5% by weight of the composition, nigrosine, titanium dioxide, cadmium sulphide, cadmium sulphoselenide, phthalocyanines, ultramarine blue, carbon black, and the like;

pulverulent fillers, which may be employed up to 50% relative to the weight of the composition, such as, for example, calcium or aluminium silicate, magnesium carbonate, kaolin, chalk, powdered quartz, mica, felspar, and the like;

nucleating agents, such as calcium fluoride, polytetrafluoroethylene or other fluorine compounds;

up to approximately 30 parts by weight, per 100 parts by weight of the total polymers, of at least one plasticizing oil compatible with the ethylene copolymer and having a flash point of at least 220° C. Among these plasticizers there may be mentioned paraffinic and isoparaffinic oils, naphthenic and aromatic oils and alkyl phthalates; and flame retardants comprising from 1 to 10% by weight of oxides of multivalent metals such as iron, tin, antimony, zinc, copper, magnesium and lead, in combination with 3 to 20% by weight of halogenated aromatic and cycloaliphatic compounds such as hexabromobenzene, decabromobiphenyl oxide, hexabromodiphenyl carbonate, and derivatives of halogenated bisphenol A, such as tetrabromobisphenol A diacetate, and the like.

The compositions according to the invention may be prepared by melt-blending, in a closed system, the saturated polyester and the components of the crosslinked polymer phase to give a uniform blend, in a multiscrew extruder such as a Werner Pfleiderer extruder, generally including from 2 to 5 kneading blocks and at least one reverse flight for producing intensive shearing, that is to say with a shear gradient of at least 500 s$^{-1}$, or other conventional plasticizing devices such as the Brabender, Banbury, Buss kneaders, and the like. This preparation step is preferably carried out at a temperature of between 200° and 290° C. and for a period of between 1 and approximately 8 minutes.

The compositions according to the invention offer an excellent compromise of properties, generally reflected in:

a tensile strength (according to ASTM standard D-638) of at least 14 MPa, an elongation at break in the transverse direction (according to ASTM standard D-638) of at least 100%, a torsional elasticity modulus (according to ISO standard 537, measured at 100° C.) of at least 5 MPa, a dimensional stability at 150° C. (according to ASTM standard D-1204) not exceeding 10%, and a notched Izod impact strength (according to ASTM standard D-256) of at least 1000 J/m.

The compositions according to the invention find choice applications in the production of soft injection-moulded articles, for example to form components of sports shoes, of high temperature-resistant piping and of protective bellows for the motor vehicle industry.

The following examples are given by way of illustration of the present invention, no limitation being implied. The properties referred to in the table below are the following.

TS L—tensile strength in the lengthwise direction, measured according to ASTM standard D-638, expressed in MPa TS T—tensile strength in the transverse direction, measured according to ASTM standard D-638, expressed in MPa EB T=elongation at break in the transverse direction, measured according to ASTM standard D-638, expressed in %

T.E.M.=torsional elasticity modulus, measured according to ISO standard 537 at 100° C., expressed in MPa D.S.=dimensional stability, measured at 150° C. according to ASTM standard D-1204 on bar-shaped injection-moulded test specimens, and expressed as percentage shrinkage in the lengthwise direction.

EXAMPLE 1 (comparative)

The composition considered consists of 50 parts by weight of a polybutylene terephthalate (PBT) with a melt index ( determined at 250° C. under 5 kg) of 79.3 dg/min, marketed by BASF under the name Ultradur® 4550 and of 50 parts by weight of a terpolymer with a melt index (determined at 190° C. under 2.16 kg) of 7 dg/min and consisting of 68% by weight of ethylene, 30% by weight of ethyl acrylate and 2% by weight of maleic anhydride, marketed by Norsolor under the name Lotader® 4700.

This composition is prepared on a Buss PR 46 co-kneader at a screw speed of 180 rev/min and a material temperature of 260° C. during 2 minutes and 30 seconds.

This composition is ill-suited to conversion by means of the injection-moulding technique, since the articles obtained exhibit delamination when injection-moulded on an Engel press at 260° C.

This composition has the properties shown in the table below.

EXAMPLE 2

The conditions of Example 1 are used to prepare a composition consisting of 50 parts by weight of Ultradur® 4550 PBT, 38 parts by weight of Lotader® 4700 and 12 parts by weight of a terpolymer containing 79% by weight of ethylene, 9% by weight of ethyl acrylate and 12% by weight of glycidyl methacrylate (GMA) with a melt index (determined at 190° under 2.16 kg) of 11 dg/min. This composition is formulated with 0.24 part of dimethylstearylamine.

The alloy is injection-moulded on an Engel press at 280° C. and gives moulded articles of good appearance, having the properties shown in the table below.

EXAMPLE 3

The conditions of Example 1 are used to prepare a composition comprising:
- 50 parts of Ultradur® 4550 PBT
- 40 parts of Lotader® 4700
- 10 parts of a terpolymer consisting of 85% by weight of ethylene, 6% by weight of ethyl acrylate and 9% by weight of GMA, with a melt index of 8 dg/min at 190° C.
- 0.3 part of dimethylstearylamine.

The injection-moulded articles are of good appearance and have the properties shown in the table below.

EXAMPLE 4 (Comparative)

The conditions of Example 1 are used to prepare a composition comprising:
- 60 parts of Lotader® 4700
- 40 parts of Ultradur® 4550 PBT Injection moulding results in articles which are visibly heterogeneous and delaminate, becoming distorted above 120° C.

EXAMPLE 5

The conditions of Example 1 are used to prepare a composition comprising:
- 40 parts of Ultradur® 4550 PBT
- 50 parts of Lotader® 4700
- 10 parts of terpolymer containing 85% by weight of ethylene, 6% by weight of ethyl acrylate and 9% by weight of GMA, with a melt index of 8 dg/min at 190° C.
- 0.5 part of dimethylstearylamine.

The alloy injection-moulded on an Engel press at 280° C. produces moulded articles of good appearance, having the properties shown in the table below.

EXAMPLE 6

The conditions of Example 1 are used to prepare a composition comprising:
- 40 parts of Ultradur® 4550 PBT
- 45 parts of Lotader® 4700
- 15 parts of terpolymer containing 94% by weight of ethylene, 3% by weight of ethyl acrylate and 3% by weight of GMA, with a melt index of 7 dg/min at 190° C.
- 0.36 part of dimethylstearylamine.

After injection moulding on an Engel press at 280° C., moulded articles are obtained, of good appearance and having the properties shown in the table below.

EXAMPLE 7

The conditions of Example 1 are used to prepare a composition comprising:
- 55 parts of Ultradur® 4550 PBT
- 36 parts of Lotader® 4700
- 9 parts of terpolymer containing 85% by weight of ethylene, 6% by weight of ethyl acrylate and 9% by weight of GMA, with a melt index of 8 dg/min at 190° C.
- 0.24 part of dimethylstearylamine.

When injection-moulded on an Engel press at 280° C., the alloy produces moulded articles of very good appearance, which have a very good tensile strength. The properties of the moulded alloy are shown in the table below.

TABLE

| Property | Example | | | | | | |
| --- | --- | --- | --- | --- | --- | --- | --- |
|  | 1 | 2 | 3 | 4 | 5 | 6 | 7 |
| TS L | 12 | 20 | 21 | 10 | 21 | 14 | 26 |
| TS T | 6 | 17 | 17 | 4 | 14 | 11 | 19 |
| EB T | 41 | 141 | 102 | 38 | 160 | 111 | 105 |
| T.E.M. | <1 | 31 | n.d. | <1 | n.d. | 14 | n.d. |
| D.S. | 20 | 0 | n.d. | 30 | 0 | 0 | 0 | n.d.: not determined

I claim:

1. Thermoplastic composition comprising at least 40% by weight and not more than 70% by weight of a crosslinked polymer phase which is a blend of
   a) at least one copolymer of 96 to 55% by weight of ethylene, of 3 to 30% by weight of at least one alkyl or cycloalkyl acrylate or methacrylate in which the alkyl or cycloalkyl group contains from 1 to 10 carbon atoms, and of 1 to 15% by weight of at least one unsaturated epoxide,
   b) at least one copolymer comprising from 84 to 55% of ethylene by weight, from 15 to 39% by weight of at least one alkyl or cycloalkyl acrylate or methacrylate in which the alkyl or cycloalkyl group contains from 1 to 10 carbon atoms, and from 1 to 6% by weight of at least one anhydride of an unsaturated dicarboxylic acid, copolymers (a) and (b) being crosslinked with
   c) at least one compound capable of accelerating the reaction between the epoxy functional group present in the copolymer (a) and the anhydride functional group present in the copolymer (b), in an amount effective to accelerate the reaction between said epoxy functional group and said anhydride functional group, with at least 30% by weight but not more than 60% by weight of at least one saturated polyester, the respective proportions of copolymers (a) and (b) in the said crosslinked polymer phase being such that the weight ratio (a)/(b) is between 0.1 and 10, said thermoplastic composition having

- a tensile strength (according to ASTM standard D-638) of at least 14 MPa,
- an elongation at break in the transverse direction (according to ASTM standard D-638) of at least 100% a torsional elasticity modulus (according to ISO standard 537) of at least 5 MPa,
- a dimensional stability at 150° C. (according to ASTM standard D-1204) not exceeding 10%, and
- a notched Izod impact strength (according to ASTM standard D-256) of at least 1000 J/m (100 Kg*cm/cm).

2. Composition according to claim 1, characterized in that compound (c) is chosen from tertiary amines, tertiary phosphines and zinc alkyldithiocarbamates.

3. Composition according to one of claims 1 or 2, characterized in that the unsaturated epoxide in copolymer (a) is glycidyl methacrylate.

4. Composition according to claim 1, characterized in that the anhydride of an unsaturated dicarboxylic acid in copolymer (b) is maleic anhydride.

5. Composition according to claim 1, characterized in that the melt index of copolymer (a) is from 1 to 50 dg/min.

6. Composition according claim 1, characterized in that the melt index of copolymer (b) is from 1 to 50 dg/min.

7. Composition according to claim 1, characterized in that the saturated polyester is chosen from polyethylene terephthalate and poly-1,4-butylene terephthalate.

8. Composition according to claim 1, characterized in that the intrinsic viscosity of the saturated polyester is from 0.3 to 1.2 dl/g.

9. Composition according to claim 1, characterized in that it additionally comprises at least one pulverulent filler.

10. Composition according to claim 1, characterized in that it additionally comprises at least one stabilizer.

11. Composition according to claim 1, characterized in that it additionally comprises at least one lubricant.

12. Composition according to claim 1, characterized in that it additionally comprises at least one flame retardant.

13. Composition according to claim 1, characterized in that it additionally comprises at least one pigment and/or dye.

14. Process for the preparation of a composition according to claim 1, characterized in that the saturated polyester and the components of the crosslinked polymer phase are melt-blended in a device producing a shear gradient of at least 500 $s^{-1}$.

15. Process according to claim 14, characterized in that the preparation is carried out at a temperature of between 200° and 290° C. and for a period of between 1 and 8 minutes.

* * * * *